(12) United States Patent
Kaplita et al.

(10) Patent No.: US 11,823,514 B1
(45) Date of Patent: Nov. 21, 2023

(54) METHOD AND APPARATUS FOR ALLOWING ACCESS THROUGH A CONTROLLED-ACCESS POINT

(71) Applicant: MOTOROLA SOLUTIONS, INC., Chicago, IL (US)

(72) Inventors: Grzegorz Kaplita, Rzeszow (PL); Michal P Brewinski, Cracow (PL); Stanislaw Jastrzab, Woowice (PL); Michal Skuza, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/818,365

(22) Filed: Aug. 9, 2022

(51) Int. Cl.
*G07C 9/25* (2020.01)
*G07C 9/00* (2020.01)

(52) U.S. Cl.
CPC ..... *G07C 9/25* (2020.01); *G07C 2009/00865* (2013.01)

(58) Field of Classification Search
CPC ....................................................... G07C 9/25

USPC ......................................................... 340/5.52
See application file for complete search history.

(56) References Cited

U.S. PATENT DOCUMENTS

| 8,971,850 B2 | 3/2015 | Klein et al. |
| 10,129,711 B1 | 11/2018 | Saadoun et al. |
| 11,361,770 B2 | 6/2022 | Neckermann et al. |
| 2015/0080061 A1* | 3/2015 | Dieringer ............ H04M 1/6066 |
| | | 455/569.1 |
| 2019/0051304 A1 | 2/2019 | Tian et al. |
| 2020/0117781 A1* | 4/2020 | Korus .................... H04W 12/60 |
| 2020/0202866 A1* | 6/2020 | Langenberg ............. G07C 9/25 |

FOREIGN PATENT DOCUMENTS

GB 2575873 A 1/2020

* cited by examiner

*Primary Examiner* — Kam Wan Ma

(57) ABSTRACT

An access-control mechanism and method for controlling the access-control mechanism is provided herein. During operation the access-control mechanism will grant access to a user when a same utterance is detected over a local microphone and via a communication system, and a time period between receptions of each utterance is within a predetermined period.

7 Claims, 5 Drawing Sheets

METHOD AND APPARATUS FOR ALLOWING ACCESS THROUGH A CONTROLLED-ACCESS POINT

BACKGROUND OF THE INVENTION

At controlled-access points such as doors to office spaces, a passage barrier may be maintained in a closed and locked state, and a person typically must swipe in, for example using an access card, to unlock a lock and gain access. Such controlled-access points allow for quick and comfortable access for regular users registered in the system. However, first responders who are unregistered may need to obtain manual access cards or codes in order to gain access. It would be beneficial if an easier access technique could be utilized by first responders in order to gain access through a controlled-access point.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
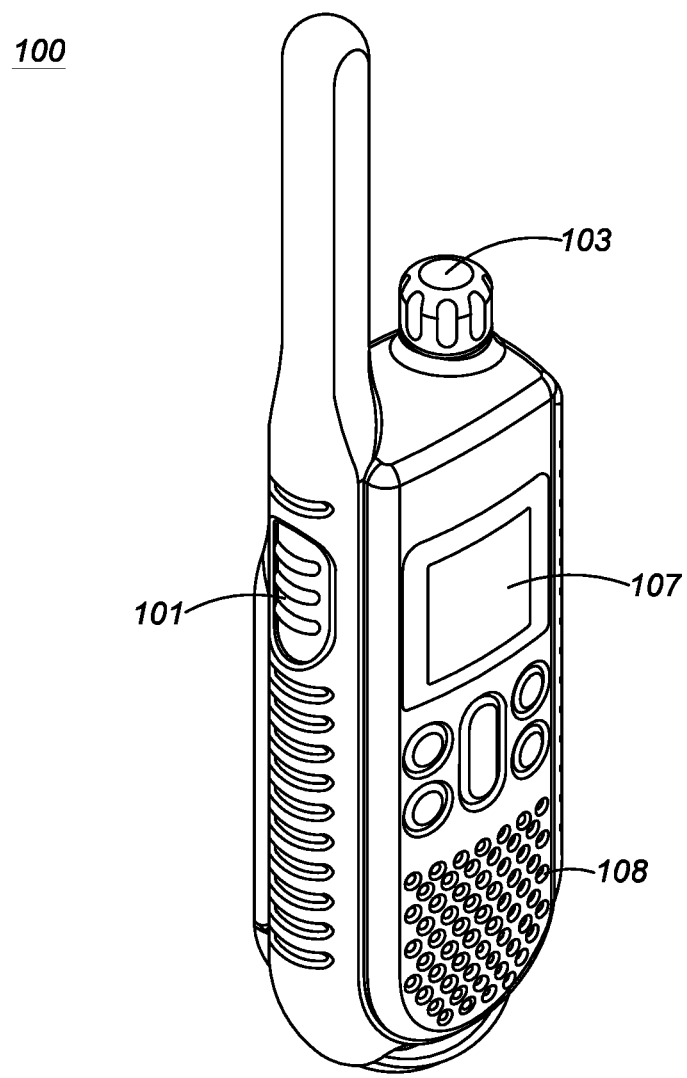
FIG. 1 illustrates push-to-talk (PTT) radio.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, an access-control mechanism and method for controlling the access-control mechanism is provided herein. During operation the access-control mechanism will grant access to a user when a same utterance is detected over a local microphone and via a communication system, and a time period between receptions of each utterance is within a predetermined period.

Expanding on the above, an access-control mechanism is equipped with a radio receiver that is assigned to a particular communication system talkgroup. The access-control mechanism only needs a local microphone and the radio receiver in order to grant access. A user, with their own radio, approaches the access-control mechanism with their radio set to transmit over a particular talkgroup that is received by the access-control mechanism. The user then activates the microphone on the access-control mechanism (e.g., by pressing a button on a control panel), presses the transmit button on their radio, preferably transmits over a particular talkgroup, and utters a phrase simultaneously into the radio and the access-control mechanism. The access control mechanism receives the uttered keyword via the local microphone and also receives the uttered keyword via the radio receiver. The access-control mechanism then compares the utterances to determine if they are the same, and if they are the same, grants access to the controlled access point controlled by the access-control mechanism.

It should be noted that with the above-described technique, access rights may be provided only when communication is received over a pre-defined talkgroup (e.g., based on the agreement with local agencies). The predefined talkgroup may comprise a talkgroup used by police officers or firefighters etc. Alternatively, only talkgroups in use with an active emergency may be utilized for the above technique. Additionally, the predefined talkgroups may be those utilized for users dispatched to an incident in the proximity of the building. Once a user is granted access to a building as discussed above, access to the building may then be restricted for all other access types (e.g., keycard access)

Turning now to the drawings wherein like numerals designate like components, FIG. 1 illustrates push-to-talk (PTT) radio 100. As shown, radio 100 comprises PTT button 101, knob 103, display/screen 107, and speaker/microphone 108. PTT button 101 comprises a standard button, that when pressed, transitions radio 100 from a listening state, to a transmit state, transmitting utilizing a specific talkgroup. Display 107 comprises a way of conveying (e.g., displaying) PTT information to the user. In particular, in an embodiment, a talkgroup may be displayed to the user as an alpha-numeric output on display 107. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user.

Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Knob 103 serves as a way to control the volume of speaker 108, and also serves as a means for switching between talkgroups. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

The user 201 (shown in FIG. 2) preferably grips or contacts the circumferential surface of knob 103 and rotates it a desired amount to scroll through menu items, for example, talkgroups that may be selected. Once knob 103 is rotated to select a particular talkgroup, any activation (pushing) of the PTT button 101 will cause radio 100 to communicate over the selected talkgroup. Any radios "listening" to the particular talkgroup will hear transmissions from the user.

Figure 2:
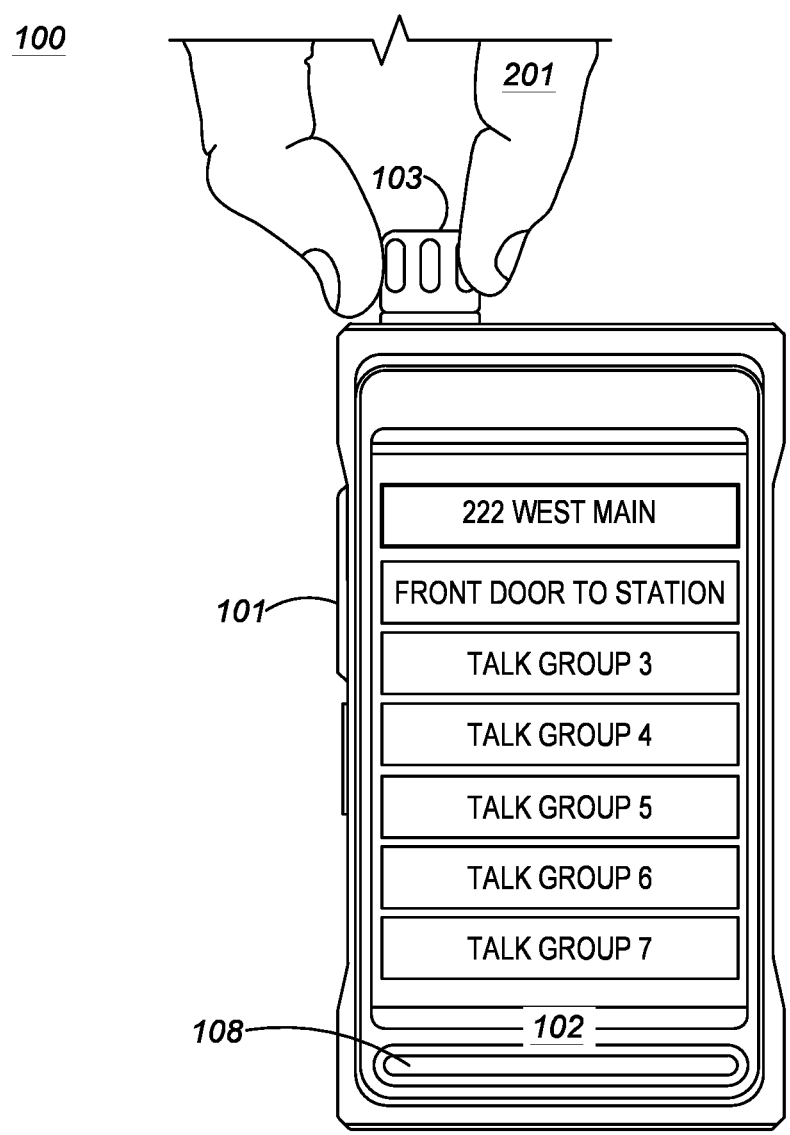
FIG. 2 illustrates push-to-talk (PTT) radio.

It should be noted that display 102 may display the names of the talkgroups, which include the names controlled-access points that may be accessed as discussed above. For example, as shown in FIG. 2, "222 West Main" and the "Front door to station" talkgroup may be displayed, so when selected, communications to their access-control mechanisms may take place over the particular talkgroup utilized for those access-control mechanisms.

As is known in the art, modern two-way radio systems comprise talkgroups, where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup.

Figure 3:
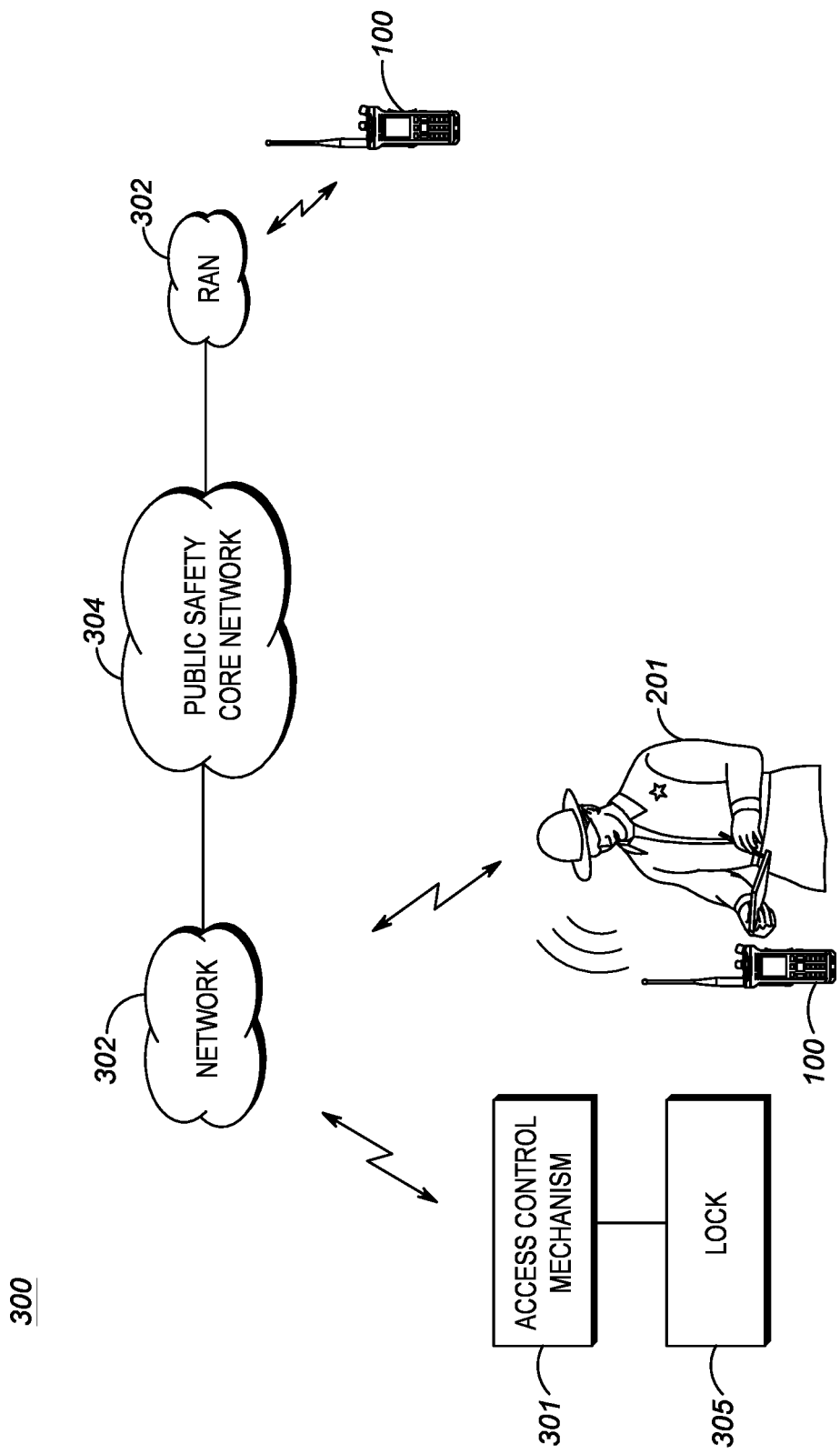
FIG. 3 depicts an environment that incorporates an access-control mechanism.

FIG. 3 depicts an environment 300 that incorporates access-control mechanism 301 as described above. It should be noted that the communication system depicted in FIG. 3 comprises a typical public-safety communication system that includes access-control mechanism 301. However one of ordinary skill in the art would recognize that other systems may be modified to encompass access-control mechanism 301 such as, but not limited to a cellular communication system, any communication system not incorporating talkgroups, a cloud-based communication system, . . . , etc. Environment 300 includes multiple radio access networks (RANs) 302, a public-safety core network 304, PTT radios 100, access control mechanism 301 and lock 305.

RANs 302 include typical RAN elements such as base stations, base station controllers (BSCs), routers, switches, and the like, arranged, connected, and programmed to provide wireless service to user equipment (e.g., radio 100 and access-control mechanism 301) in a manner known to those of skill in the relevant art. RANs 302 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RANs 302 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RANs 302 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 304 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 304 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group (which may include access-control mechanism 301). In another example, communication devices may dynamically affiliate with a group (and also disassociate with the group) perhaps based on user input, and the switching and/or radio network may track group membership and route new group calls according to the current group membership.

Radios 100 may be any suitable computing and communication device configured to engage in wireless communication with the RANs 302, and ultimately to other radios or access-control mechanism 301 over the air interface as is known to those in the relevant art.

Expanding on the above, each user of the system may possess a radio to communicate over many differing talkgroups. Communication on various talkgroups may be routed by RAN 302 and network 304 to radios and access control mechanism 301.

Access-control mechanism 301 is configured to unlock lock 305 based upon certain conditions being met. As discussed above, in one embodiment, lock 305 may comprise a lock to a passage barrier such as a door through which authorized persons may pass. However, in alternate embodiments access may be given by unlocking lock 305 to any physical structure, database, . . . , etc. based on the certain conditions being met.

Figure 4:
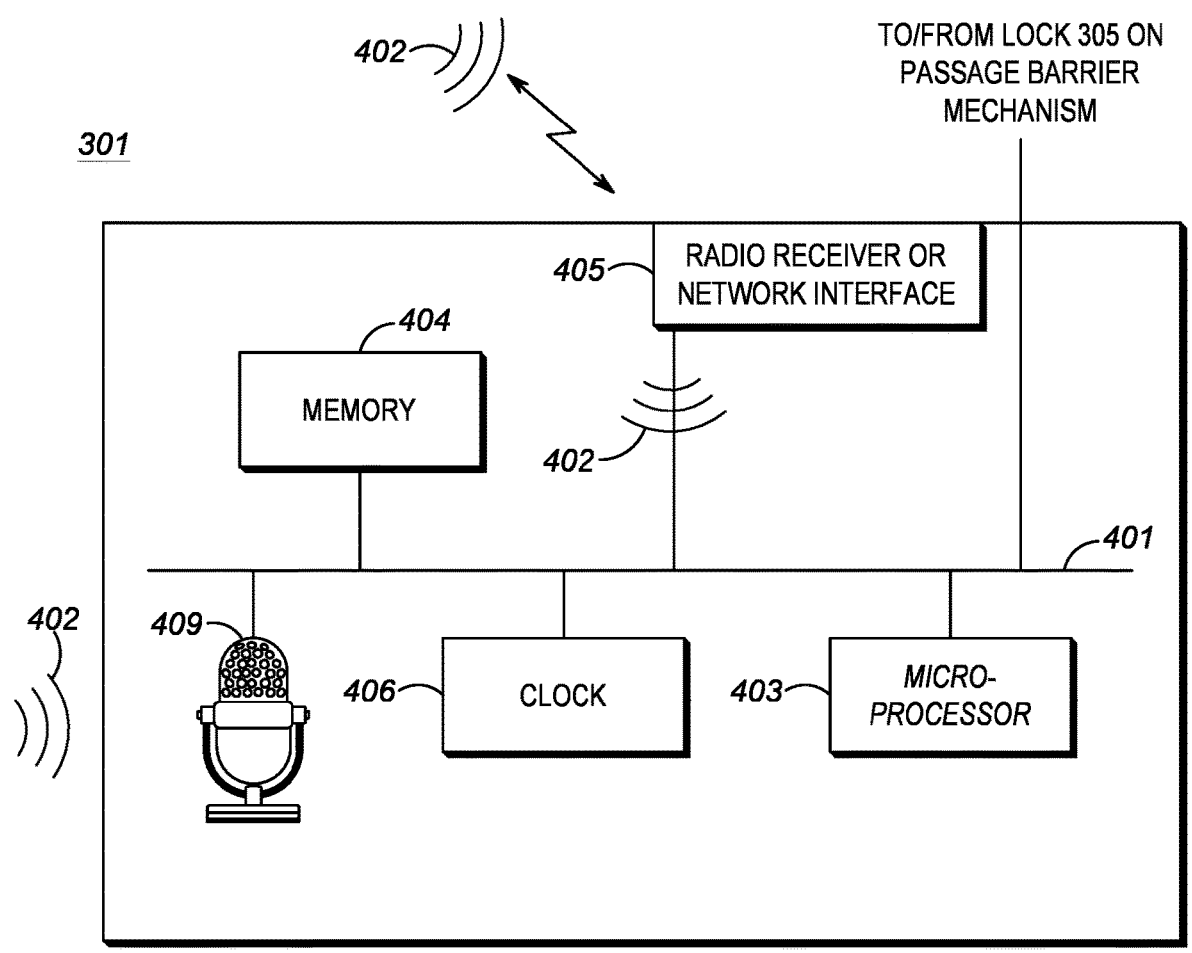
FIG. 4 is a device diagram showing an access-control mechanism for controlling a passage barrier.

FIG. 4 is a block diagram of access-control mechanism 301. In an embodiment, access-control mechanism 301 controls access to any entryway, however, in alternate embodiments of the present invention, access-control mechanism may control access to any physical structure, or other things such as computers, safes, databases, automobiles, . . . , etc. FIG. 4 shows those components (not all necessary) for access-control mechanism 301 to receive an utterance from a radio using a particular talkgroup, receive an utterance from a microphone, determine if they are the same utterance, and grant access based on the determination.

Access-control mechanism 301 may include various components connected by bus 401. Access-control mechanism 301 may include a hardware processor/microprocessor (logic circuitry) 403 such as one or more central processing units (CPUs) or other processing circuitry able to provide any of the functionality described herein when running instructions. Logic circuitry 403 may be connected to memory 404 that may include a non-transitory machine-readable medium on which is stored one or more sets of instructions. Memory 404 may include one or more of static or dynamic storage, or removable or non-removable storage, for example. A machine-readable medium may include any medium that is capable of storing, encoding, or carrying instructions for execution by processor 403, such as solid-state memories, magnetic media, and optical media. Machine-readable medium may include, for example, Electrically Programmable Read-Only Memory (EPROM), Random Access Memory (RAM), or flash memory.

The instructions may enable communication access-control mechanism 301 to operate in any manner thus programmed, such as the functionality described specifically herein, when logic circuitry 403 executes the instructions. The machine-readable medium may be stored as a single medium or in multiple media, in a centralized or distributed manner. In some embodiments, instructions may further be transmitted or received over a communications network via a network interface (not shown) utilizing any one of a number of transfer protocols (e.g., frame relay, internet protocol (IP), transmission control protocol (TCP), user datagram protocol (UDP), hypertext transfer protocol (HTTP), etc.).

As shown, access-control mechanism 301 may include radio receiver 405 (e.g., a receiver that utilizes a public-safety communication-system protocol) and microphone 409. In other implementations, access-control mechanism 301 may include more, fewer, or different components. Regardless, all components are connected via common data busses 401 as known in the art.

Radio receiver 405 may comprise a well known receiver that utilizes any number of network system protocols. For example, radio receiver 405 may be configured to utilize a next-generation cellular communications protocol operated by a cellular service provider, or any public-safety protocol such as an APCO 25 network or the FirstNet broadband network. Radio receiver 405 receives communications from a user over a particular talkgroup. It should be noted that radio receiver 405 is shown as part of access-control mechanism 301, however, radio receiver 405 may be located in a RAN 302 (e.g., a base station of RAN 302), with a direct link to access-control mechanism 301. In this configuration, a radio receiver existing outside of access-control mechanism 301 will provide logic circuitry 403 the utterance 402 through a network interface (not shown in FIG. 4).

Microphone 409 provides a mechanism for receiving human voice and providing it to logic circuitry 403. More specifically, microphone 409 comprises a device that translates sound vibrations in the air into electronic signals and provides the electronic signals to logic circuitry 403.

During operation, an utterance 402 (e.g., a person uttering the word "unlock") is received at microphone 409. At substantially the same time, radio receiver 405 receives the same utterance 402 over a particular talkgroup (e.g., a talkgroup reserved specifically for operating access-control mechanism 301). Both the utterance received at microphone 409, and the utterance received at radio receiver 405 are passed to logic circuitry 403. Logic circuitry compares the two to determine if they were the same utterance. Additionally, logic circuitry determines if the two utterances were received within the same period of time of each other (e.g., within 500 ms of each other). If both are true, then logic circuitry 403 grants access to a controlled access point by unlocking a door, opening a window, unlocking an elevator, . . . , etc. This is preferably done by logic circuitry 403 sending a control signal to a lock, unlocking it.

When comparing the two utterances, audio signatures (or spectrogram) for the two utterances will be generated and compared to find if there is any similarity between the two utterances. For example, logic circuitry 203 can identify the peaks in the spectrogram and extract the frequency and timestamp for each of the peaks in each utterance. Logic circuitry 203 can also identify the time difference between two peaks as part of the audio signature. Once the audio signature is extracted for each utterance, logic circuitry 203 can time align each utterance, and compare the audio signatures between the two audio to detect if there is any similarity. Logic circuitry 203 will generate a similarity score to determine if the two utterances are similar, or not similar.

When determining if the two utterances were received within a predetermined time period of each other, logic circuitry 403 will access clock 406 to determine a reception time for each utterance 402. If subtracting the reception time for the first utterance from the reception time of the second utterance results in an absolute difference of less than a predetermined threshold (e.g., 500 ms), then the utterances are determined to received at a same time. Thus, utterances received, for example, within 500 ms of each other are considered by logic circuitry 403 to have been received simultaneously (e.g., at the same time).

In another embodiment of the present invention, multiple microphones 409 are coupled to logic circuitry 403, with each microphone being associated with a particular lock 305/passage barrier (e.g., multiple microphones close to each other, for example down a hallway with multiple access-controlled doors). In that scenario, a received voice signal strength (volume level) at each microphone will be determined by logic circuitry 403 to identify which lock is the closest to the person speaking. Only the lock associated with a microphone closest to the person speaking (e.g., the microphone having the highest received voice volume) will be unlocked as described above.

With the above in mind, access-control mechanism 301 comprises an apparatus comprising a microphone 409, a radio receiver or network interface 405, and logic circuitry 403. The logic circuitry 403 is configured to receive an utterance from the microphone, receive a second utterance from the radio receiver or network interface, compare the first and the second utterance to determine if the first and the second utterance are the same utterance, and unlock a lock based on the fact that the first and the second utterances being the same utterance.

As discussed above, the utterance received from the radio can be sent to the radio utilizing a specific talkgroup.

As discussed above, a clock 406 may be provided and the logic circuitry is further configured use the clock to determine a reception time of the first utterance, determine a reception time of the second utterance, determine an absolute difference between the reception of the first utterance and the reception of the second utterance, and wherein the logic circuitry unlocks the lock additionally based on the absolute difference between the reception of the first utterance and the reception of the second utterance. In this scenario, the logic circuitry is configured to unlock the lock when the first and the second utterances are the same utterance, and are received at a same time.

Figure 5:
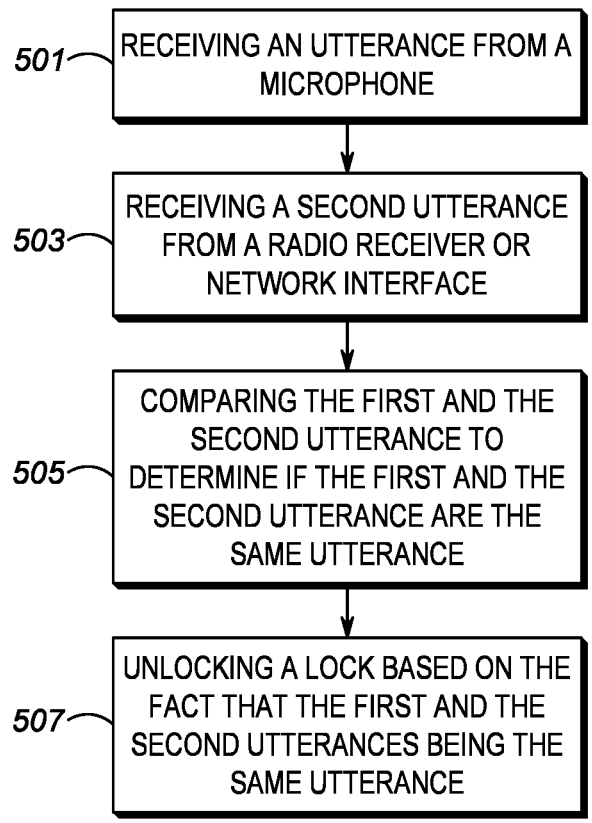
FIG. 5 is a flow chart showing operation of the access-control mechanism of FIG. 4.

FIG. 5 is a flow chart showing operation of access-control mechanism 301 of FIG. 4. The logic flow begins at step 501 with logic circuitry 403 receiving an utterance from microphone 409. At step 503 logic circuitry 403 receives a second utterance from a radio receiver or network interface 405 and at step 505 compares the first and the second utterance to determine if the first and the second utterance are the same utterance. Finally, at step 507, logic circuitry 403 unlocks a lock (or, more specifically, sends an unlock signal to a lock) based on the fact that the first and the second utterances being the same utterance.

As discussed above, the step of receiving the second utterance may comprise the step of receiving the second utterance a radio sent to the radio utilizing a specific talkgroup.

Additionally, logic circuitry 403 may utilize clock 406 to determine a reception time of the first utterance, determine a reception time of the second utterance, determine an absolute difference between the reception of the first utterance and the reception of the second utterance, and wherein the step of unlocking the lock is additionally based on the absolute difference between the reception of the first utterance and the reception of the second utterance. In this scenario the step of unlocking the lock comprises the step of unlocking the lock when the first and the second utterances are the same utterance, and are received at a same time.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising: a microphone; a radio receiver or network interface; logic circuitry configured to: receive a first utterance from the microphone; receive a second utterance from the radio receiver or network interface; compare the first and the second utterance to determine if the first and the second utterance are the same utterance; and unlock a lock based on a fact that the first and the second utterances being the same utterance; wherein the utterance received from the radio was sent to the radio utilizing a specific talkgroup.

2. The apparatus of claim 1 wherein the logic circuitry is further configured to:
   determine a reception time of the first utterance;
   determine a reception time of the second utterance;
   determine an absolute difference between the reception of the first utterance and the reception of the second utterance; and
   wherein the logic circuitry unlocks the lock additionally based on the absolute difference between the reception of the first utterance and the reception of the second utterance.

3. The apparatus of claim 2 wherein the logic circuitry is configured to unlock the lock when the first and the second utterances are the same utterance, and are received at a same time.

4. An apparatus comprising:
   a microphone;
   a radio receiver or network interface;
   logic circuitry configured to:
      receive a first utterance from the microphone;
      receive a second utterance from the radio receiver or network interface;
      compare the first and the second utterance to determine if the first and the second utterance are the same utterance; and
      determine a reception time of the first utterance;
      determine a reception time of the second utterance;
      determine an absolute difference between the reception of the first utterance and the reception of the second utterance;
      unlocking a lock based on a fact that the first and the second utterances being the same utterance received at a same time;
   wherein the utterance received from the radio was sent to the radio utilizing a specific talkgroup.

5. A method comprising the steps of: receiving an utterance from a microphone; receiving a second utterance from a radio receiver or network interface; comparing the first and the second utterance to determine if the first and the second utterance are the same utterance; and unlocking a lock based on the fact that the first and the second utterances being the same utterance; wherein the step of receiving the second utterance comprises the step of receiving the second utterance a radio sent to the radio utilizing a specific talkgroup.

6. The method of claim 5 further comprising the steps of:
   determining a reception time of the first utterance;
   determining a reception time of the second utterance;
   determining an absolute difference between the reception of the first utterance and the reception of the second utterance; and
   wherein the step of unlocking the lock is additionally based on the absolute difference between the reception of the first utterance and the reception of the second utterance.

7. The method of claim 6 wherein the step of unlocking the lock comprises the step of unlocking the lock when the first and the second utterances are the same utterance, and are received at a same time.

* * * * *